(12) United States Patent
Kumar et al.

(10) Patent No.: US 12,169,484 B2
(45) Date of Patent: Dec. 17, 2024

(54) TECHNIQUES FOR ADAPTIVE INDEPENDENT COMPRESSION OF KEY AND NON-KEY PORTIONS OF DATABASE ROWS IN INDEX ORGANIZED TABLES (IOTS)

(71) Applicant: Oracle International Corporation, Redwood Shores, CA (US)

(72) Inventors: Ken Kumar, Karnataka (IN); Kamaljit Shergill, Maidenhead (GB); Aurosish Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/137,321

(22) Filed: Apr. 20, 2023

(65) Prior Publication Data

US 2024/0119037 A1    Apr. 11, 2024

Related U.S. Application Data

(60) Provisional application No. 63/414,383, filed on Oct. 7, 2022.

(51) Int. Cl.
*G06F 16/22* (2019.01)
(52) U.S. Cl.
CPC .................. *G06F 16/221* (2019.01)
(58) Field of Classification Search
CPC ...................................... G06F 16/221
USPC ....................................................... 707/693
See application file for complete search history.

(56) References Cited

U.S. PATENT DOCUMENTS

| 6,006,232 | A | * | 12/1999 | Lyons | ..................... H03M 7/30 |
| 6,859,808 | B1 | * | 2/2005 | Chong | ................ G06F 16/2246 |
| | | | | | 707/999.102 |
| 7,437,523 | B1 | | 10/2008 | Ting | |
| 2006/0036633 | A1 | * | 2/2006 | Chong | .................. G06F 16/367 |
| 2006/0179071 | A1 | * | 8/2006 | Panigrahy | ........... G06F 16/9014 |
| 2007/0079296 | A1 | * | 4/2007 | Li | ....................... G06F 9/45516 |
| | | | | | 717/136 |
| 2011/0274204 | A1 | | 11/2011 | Ko | |

(Continued)

OTHER PUBLICATIONS

Swanson, Nancy, "What Is Smart Scan?", Cloud-Ready Infrastructure Blog, https://blogs.oracle.com/infrastructure/post/what-is-smart-scan, dated Feb. 4, 2020, 5 pages.

*Primary Examiner* — Cam Linh T Nguyen
(74) *Attorney, Agent, or Firm* — Hickman Becker Bingham Ledesma LLP (57) ABSTRACT

Techniques for adaptive, independent compression of key and non-key sections of rows in index-organized tables (IOTs) are provided. In one technique, an IOT is stored that comprises a plurality of rows, each of which comprises a key section and a non-key section. After storing the IOT, a compression technique is performed on the non-key section of each row in the plurality of rows to generate a plurality of compressed non-key sections. However, none of the key sections of the plurality of rows is compressed. In a related technique, instead of compressing the non-key section of each row, the key section of each row is compressed. In a related technique, both sections are compressed, but using different compression techniques. The compression techniques may be determined based on data access history of the different sections of the rows.

20 Claims, 5 Drawing Sheets

```
300
 │
 ▼
┌─────────────────────────────────────────────────────────────┐
│                            310                              │
│  STORE AN INDEX-ORGANIZED TABLE (IOT) THAT COMPRISES        │
│                     MULTIPLE ROWS                            │
└─────────────────────────────────────────────────────────────┘
                              │
                              ▼
┌─────────────────────────────────────────────────────────────┐
│                            320                              │
│  PERFORMANCE A FIRST COMPRESSION TECHNIQUE ON A NON-KEY     │
│                  SECTION OF THE IOT                          │
└─────────────────────────────────────────────────────────────┘
```

(56) References Cited

U.S. PATENT DOCUMENTS

| | | | |
|---|---|---|---|
| 2011/0274211 A1 | 11/2011 | Ko | |
| 2011/0280327 A1 | 11/2011 | Ko | |
| 2011/0286535 A1 | 11/2011 | Ko | |
| 2011/0299628 A1 | 12/2011 | Ko | |
| 2012/0054161 A1* | 3/2012 | Fusco | H04L 69/04 707/693 |
| 2012/0296881 A1* | 11/2012 | Christian | G06F 16/2272 707/693 |
| 2014/0074805 A1* | 3/2014 | Kapoor | G06F 16/902 707/693 |
| 2016/0179896 A1* | 6/2016 | Finlay | G06F 16/24561 707/693 |
| 2016/0292037 A1 | 10/2016 | Kandukuri | |
| 2016/0292049 A1 | 10/2016 | Kandukuri | |
| 2017/0116280 A1* | 4/2017 | Shergill, Jr. | G06F 16/2272 |
| 2019/0034466 A1* | 1/2019 | Kim | G06F 16/113 |
| 2019/0364459 A1 | 11/2019 | Lee | |
| 2020/0097571 A1* | 3/2020 | Mathur | G06F 16/2282 |
| 2021/0391990 A1* | 12/2021 | McElveen | H04L 9/0643 |
| 2022/0050628 A1 | 2/2022 | Basu | |
| 2022/0292543 A1 | 9/2022 | Henderson | |

\* cited by examiner

TECHNIQUES FOR ADAPTIVE INDEPENDENT COMPRESSION OF KEY AND NON-KEY PORTIONS OF DATABASE ROWS IN INDEX ORGANIZED TABLES (IOTS)

BENEFIT CLAIM

The application claims the benefit under 35 U.S.C. § 119(e) of provisional application 63/414,383, filed Oct. 7, 2022, by Ken Kumar et al., the entire contents of which is hereby incorporated by reference.

TECHNICAL FIELD

The present disclosure is generally related to index-organized tables (IOTs) and, more specifically, to independently compressing different portions of an IOT.

BACKGROUND

Index-organized tables (IOTs) are used by large enterprises. A common application of IOTs is to implement Type-Ahead Search (also known as Auto-Complete). One example of this is in product catalog websites where online catalogs can be progressively searched based on the name of a product (stored as Primary Key columns), and associated attributes such as inventory status (stored in non-key columns) can be simultaneously displayed in an efficient manner. Such tables can be very large in size, sometimes growing to hundreds of terabytes (TBs) in size. Thus, compressing IOTs is a critical requirement for such enterprises, both from the perspective of reducing storage costs and improving access latency.

Historically, IOTs have been primarily thought of as an extension to B-tree indexes, and hence, only key compression techniques have been used. One of the compression algorithms for compressing the key columns of an IOT is a prefix-compression algorithm where rows are split into a prefix portion and a suffix portion, where the prefix portion is a subset of the Primary Key columns which can potentially be shared across multiple rows. However, this algorithm is very restrictive since it requires users to specify the number of prefix columns at the table level. There are two challenges with this approach which makes the current IOT key compression undesirable.

First, identifying an optimal prefix column count for the entire IOT requires a deep understanding of the data distribution. Second, since there could be significant variation in data distribution from one block to another, choosing the wrong prefix column count can lead to negative compression. B-tree indexes on heap table data have a similar problem. However, these challenges can be avoided by using an adaptive prefix-compression technique that compresses the index data on a block-by-block basis, i.e., the number of prefix key columns can vary across blocks, including the choice of not compressing at all if it would lead to negative compression. This improved key compression technique works for indexes since they only contain key columns that are used to order data.

However, since IOTs also contain non-key columns that are completely random and unordered, this technique cannot be applied to the non-key section of IOTs. As additional attributes are tracked for each row (for example, additional details about a product, such as most-bought-by-age-group, most-bought-in-country, etc., may be added to the IOT row over the years), the non-key section dominates the storage footprint.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for compressing different portions of IOT columns are provided. In one technique, a non-key section of an IOT row is compressed independently of whether or how the key section of the IOT row is compressed, including in cases where one or more non-key columns are stored in an overflow segment, which is described in more detail herein. Similarly, a key section of an IOT row may be compressed independently of whether or how the non-key section of the IOT row is compressed.

In a related technique, one set of rows in an IOT that are stored in one data block are compressed in one way and another set of rows stored in a different block of the IOT are compressed in a different way or not at all. Data distributions within an IOT may fluctuate significantly, meaning that a single compression technique or a single compression configuration of an IOT may not be optimal for many portions of the IOT, resulting in negative compression for those portions. By applying one or more compression algorithms adaptively at a block level granularity, negative compression may be avoided.

In a related technique, data access history is tracked to determine which compression algorithms/techniques to apply to an IOT. This provides the user with autonomous compression without requiring any prior knowledge of data distribution or any manual user intervention.

Embodiments improve computer-related technique by adaptively compressing different portions of an IOT in order to achieve significant reduction in storage footprint without significantly sacrificing performance of read and update queries.

System Overview

Figure 1:
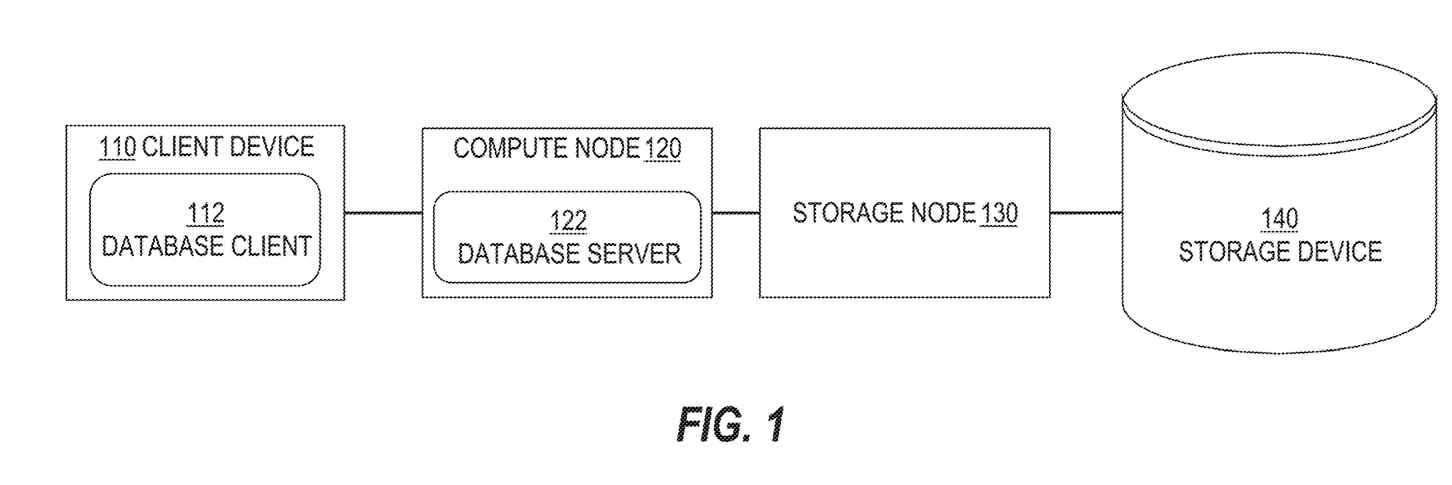
FIG. 1 is a block diagram that depicts an example database system 100 for processing queries, in an embodiment.

FIG. 1 is a block diagram that depicts an example database system 100 for processing queries, in an embodiment. Database system 100 comprises at least four entities: a client device 110 (that hosts a database client 112), a compute node 120 (that hosts a database server 122), a storage node 130, and a storage device 140. Although only a single instance of each entity is depicted, database system 100 may comprise multiple client devices, multiple compute nodes, multiple storage nodes, and/or multiple storage devices. Additionally, or alternatively, compute node 120 may host multiple database servers that execute concurrently and can process database statements in parallel with each other.

Client device 110 is communicatively coupled to compute node 120. Client device 110 and compute node 120 may be located in the same network or subnet or may be connected via a wide area network (WAN) or the Internet. Database client 112 transmits database statements to compute node 120. Examples of database statements include data definition language (DDL) statements (such as create table, create index, create IOT), data manipulation language (DML) statements that update data in a database (e.g., delete, modify, and insert), and queries that request data from the database. Database statements may conform to one of multiple languages, an example of which is Structured Query Language (SQL) and its variants.

A database statement may be composed based on input from a user. For example, a user provides input (e.g., through a user interface on client device 110) to database client 112, which translates the input into a database statement that compute node 120 recognizes and can process.

Compute node 120 comprises database server 122 that receives and processes database statements. While processing database statements, database server 122 sends data requests to storage node 130. A data request may identify one or more database objects (identified in the corresponding database statement) to retrieve, such as an index-organized table (IOT). A data request may identify one or more predicates from the corresponding database statement, such as a column value or range of column values, names of columns to return, etc.

Storage node 130 retrieves data blocks from storage device 140 in response to data requests from compute node 120. As described in more detail herein, storage node 130 may process retrieved data blocks before transmitting those data blocks (or modified versions thereof) to compute node 120. Examples of storage device 140 include a hard disk drive (HDD) and a solid state drive (SSD), such as Flash.

Storage device 140 stores data in data blocks, each of which is a contiguous area of persistent (or non-volatile) memory. Each data block has a unique data block address (DBA) through which the data block may be referenced. A data block may have a fixed size, such as 8 KB. The format of a data block may vary depending on the type of data stored in the data block. For example, a data block may store rows of an index-organized table (IOT).

Each data block is associated with a header that informs the node that processes the data block about the type of data within the data block and how it is organized. For example, a header for a data block may indicate that the data block contains rows of an IOT. As another example, a header for a data block may indicate whether the data within the data block is compressed and the type of compression used, if any. As another example, a header for a data block may indicate the number of columns and their respective sizes.

Index-Organized Table

An IOT has a storage organization that is a variant of a primary B-tree. Unlike an ordinary (heap-organized) table whose data is stored as an unordered collection (heap), data for an IOT is stored in a B-tree index structure in a primary key sorted manner. Each leaf block in the index structure stores key columns and, optionally, also non-key columns. An IOT is stored in one or more data blocks, each data block containing one or more rows of the IOT. Each data block includes a block header that indicates the number of key columns for each row. A key section of an IOT refers to one or more key columns of the IOT, while a non-key section of an IOT refers to one or more non-key columns of the IOT.

Figure 2:
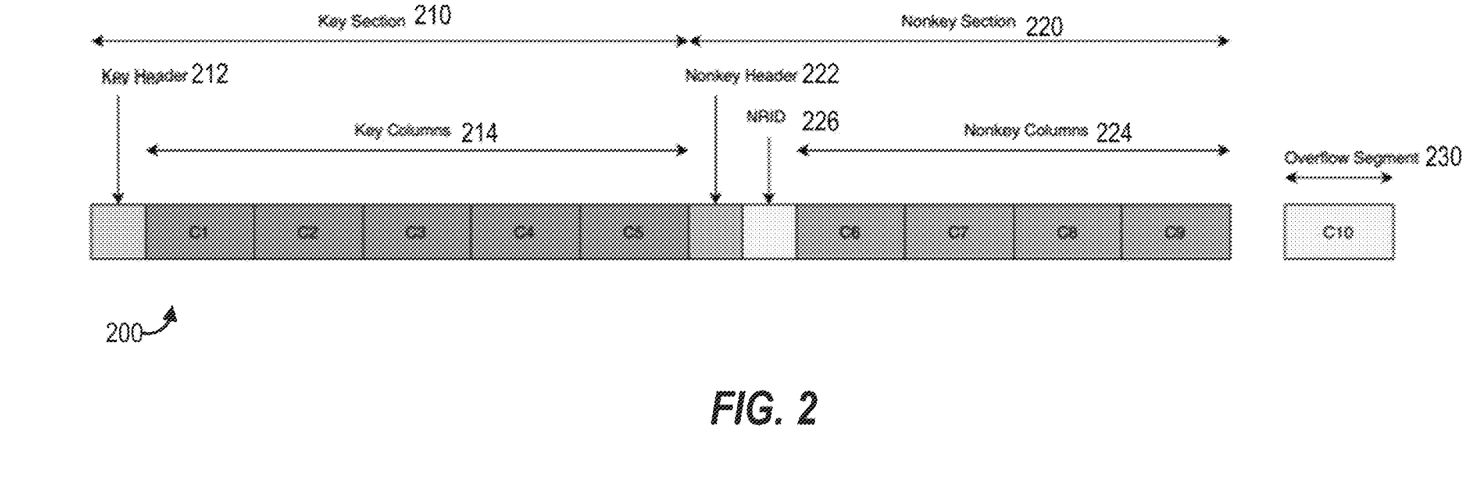
FIG. 2 is a block diagram that depicts an example row of an IOT, in an embodiment.

FIG. 2 is a block diagram that depicts an example row of an IOT, in an embodiment. This IOT may have been created based on the following create database statement:

create table tiot1 (c1 number, c2 integer, c3 number, c4 number, c5 number, c6 number, c7 integer, c8 number, c9 number, c10 number, primary key (c1,c2,c3,c4,c5))
  organization index [which means that this table is to be stored as an IOT]
  including c9 [which means that c9 must be in the index segment of a row]
  overflow;

Another way to declare an overflow segment is to specify a percentage threshold value of the block size. If a column causes a row to cross that percentage threshold value, then the column will be stored in an overflow segment. An example of a create database statement for an IOT that involves a percentage threshold specification is as follows:

create table tiot2 (c1 number, c2 number, c3 varchar2 (2000), c4 varcar2(2000), primary key (c1, c2))
  organization index [which means that this table is to be stored as an IOT]
  pctthreshold 10 [which means if a column exceeds the 10% threshold of the block size, then the column will be stored in an overflow segment]
  overflow;

Row 200 includes a key section 210 and a non-key section 220. Each section includes one or more columns. For example, key section 210 corresponds to columns C1-C5 (which are key columns 214) while non-key section 220 corresponds to columns C6-C9 (which are non-key columns 224). The rows are ordered based on only the key columns.

Each row in an IOT includes an index segment and an optional overflow segment to store column data that, if included in the index segment, would exceed a maximum size for the row. In other words, an overflow segment stores (non-key) column data that is unable to fit into the index segment of the corresponding row. An overflow segment includes column data for one or more columns. Overflow segment 230 in FIG. 2 is an example of an overflow segment that stores data for column C10. Overflow segment 230 may be considered part of non-key section 220. An overflow segment may result from columns with variable character strings that vary in length from row to row. In other words, if there is a large column value for one or more columns, then column data for those columns may reside in an overflow segment. Thus, some rows of an IOT may be large enough in bytes that they each require an overflow segment while other rows of the IOT may not require an overflow segment. Due to the scenario where data for a column may reside in an index segment for some rows and may reside in an overflow segment for other rows, each row has a non-key header that indicates the number of non-key columns for that row. In other words, it is possible for different rows in the same data block to have a different number of non-key columns. The total number of non-key columns is fixed throughout the table. Thus, the total of (i) the number of non-key columns in the data block and (ii) the number of non-key columns in an overflow segment will be fixed. Nevertheless, trailing nonkey columns may be truncated if those trailing non-key columns are all NULL.

If a row has an overflow segment, then the row includes an overflow reference (e.g., NRID 226 in FIG. 2) that indicates where the overflow segment is stored in storage device 140, i.e., in a data block that is different than the data block that stores the corresponding index segment. An index segment includes the entire key section. Thus, an overflow segment, if one exists for a row, stores at least a portion of the non-key section.

In an embodiment, each row of an IOT includes a key header and a non-key header, such as a key header 212 for row 200 and a non-key header 222 for row 200. Key header 212 is part of key section 210 and non-key header 222 is part of non-key section 220. A key header includes a flag that indicates whether there is a non-key section for the corresponding row. A key header also includes lock data (e.g., a bit or a byte) that indicates whether the corresponding row (or key section) is locked.

In an embodiment, each key column in a key section of a row includes a length value and column data. The length value indicates how long the column data is. Examples of data types of column data include number, integer, date, time, Boolean, and variable length character string. Nevertheless, the storage layer might not store data that indicates or identifies the type of column data.

In an embodiment, a non-key header for a non-key section includes flag data that indicates whether there is an overflow segment. A non-key header may also include a column count that indicates the number of columns that follow the non-key header.

Compression Techniques

A number of compression techniques may be applied to a set of data. Some compression techniques are considered "lightweight" (in that the time to compress and decompress is not relatively significant), while other compression techniques are considered "heavyweight", in that the time to compress and decompress is relatively significant. Lightweight compression techniques are online transaction processing (OLTP)-friendly, meaning OLTP applications may quickly access data that is compressed using lightweight compression without violating latency requirements.

Examples of lightweight compression techniques include prefix encoding, dictionary encoding, run-length encoding (RLE), delta encoding (i.e., base plus offset), and row store advanced compression (RSAC), which is a type of dictionary encoding. Prefix encoding involves considering values across each row and identifying common prefixes among multiple rows.

Dictionary encoding involves generating a dictionary for all values in a column. Thus, if there are three columns in an IOT that are dictionary encoded, then there are three different dictionaries, one for each of the three columns. RSAC is a type of dictionary encoding where a single dictionary is generated for multiple columns of an IOT and, therefore, includes values of all those columns (as well as the corresponding dictionary-encoded values).

Examples of heavyweight compression include hybrid columnar compression (HCC) and bit compression, examples of which include o-zip (which is more lightweight relative to the other heavyweight compression techniques), L0, and BZ2, the last of which is normally used for archival data. In HCC, a batch of rows is selected, columnar representations of the batch of rows are created, the columnar representations are serialized, becoming a single row, and the single row is stored in a data block. However, modification of any data item in an HCC row, results in deleting that data item in the single row and then the updated data item is placed in another data block that is different than the data block in which the HCC row resides.

One or more computing components may implement one or more compression techniques. Such components may include a compression component implemented within database server 122 or a compression component that is separate from database server 122, but hosted on compute node 120. Similarly, one or more computing components may implement one or more decompression techniques. Such components may be the same as the compression component(s) and/or may be implemented within database server 122 or separate from database server 122 and hosted on compute node 120. Additionally or alternatively, compression and/or decompression component(s) may be hosted on storage node 130 to allow for compression and/or decompression to occur closer to storage device 140.

Compressed IOT

An IOT may be initially un-compressed. For example, a definition of an IOT lacks any indication of compression on any portion of the IOT. Then, over time, one or more portions of the IOT become compressed. Such later compression may be due to manual inputs from a user, such as a database administrator. The user may determine, based on log statistics that are generated in response to different data accesses (e.g., reads and/or writes to the IOT), that loading certain portions of the IOT into memory is taking a significant amount of time and, thus, performance related to the IOT may be improved through compression. Alternatively, such later compression may be due to an automatic determination by a database system that stores and/or accesses the IOT.

Instead of being initially un-compressed, an IOT may be initially compressed. For example, a user creates a definition, of an IOT, that specifies which portions (e.g., a set of one or more columns, an index segment, an overflow segment, a key section, and/or a non-key section) are compressed and, optionally, a type of compression for those portion(s). For example, an IOT creation definition or statement identifies (1) a non-key section in the index segment as being compressed using dictionary encoding and (2) key columns A and B as being compressed using prefix compression. This may be helpful in scenarios where a user (e.g., a database administrator) knows which portions of the IOT will be accessed frequently and which will not be accessed frequently.

Regardless of the initial state of an IOT (whether un-compressed, partially compressed, or fully compressed (meaning all portions of the IOT are compressed using some compression technique)), the compression status of the IOT may change over time based on (a) user input and/or (b) an automated process that determines that a different compression configuration is warranted based on data access history, which is described in more detail herein. A "compression configuration" refers to the compression status of each portion of an IOT. An initial IOT definition may include a compression configuration. If an IOT definition does not include a compression configuration, then no portion of the IOT is compressed, at least initially. Later, an initially un-compressed IOT may be associated with a compression configuration, whether based on user input or based on an automatic determination using data access history as described herein.

Data Access Tracking

In an embodiment, data access to an IOT is tracked in order to determine whether one or more portions of the IOT are to be compressed (if not already compressed) or decompressed (if already compressed). The two main types of data accesses are reads (as a result of queries on the IOT) and writes (or modifications) on the IOT, such as additions, deletions, and updates. Reads may be reads of any portion of an IOT, including overflow segments scans. Writes may be in the form of data manipulation language (DML) statements. Portions of an IOT that are accessed frequently may not be compressed at all or have lightweight compression. In contrast, portions of an IOT that are rarely accessed may be compressed using a heavyweight compression technique.

Data access tracking may include recording, for each data access from an IOT, a location of the data access (e.g., key column A in index segment, non-key column D in index segment, non-key column F in overflow segment), a timestamp of the data access, a type of the data access (e.g., read v. write), and/or a sub-type of access (e.g., predicate, projection, and aggregation for read accesses and additions, deletions, and updates for write accesses). Data access history may be visualized with a heat map where portions of an IOT that are colored red have been accessed. The heat map may include different colors for different types of accesses and/or different sub-types of accesses.

Data access tracking may be performed by an access tracking component, which may be implemented in database server 122 or may be implemented separately therefrom, but on compute node 120 and/or storage node 130. Data access history may be evaluated by the same component or by a different component, referred to herein as a "compression determination component." Compression determination component analyzes data access history that is generated by the access tracking component and determines whether and, optionally, which compression technique (or decompression technique) is to be applied to a portion of an IOT. Whether implemented in the same process or program or implemented separately, the access tracking component and the compression determination component may be implemented in software, hardware, or any combination of software and hardware.

If a column in an IOT is accessed frequently using predicates (e.g., specified in a query), then the compression determination component may determine that dictionary encoding may be useful because a predicate value may be translated using a dictionary that corresponds to the column. However, if a column in an IOT is accessed frequently using projection, then dictionary encoding might not be useful since each compressed value in the column will need to be translated using a dictionary that corresponds to the column. In this example, no compression of the column may be warranted. As another example, if the main type of write data access to a portion of an IOT is deletes, then HCC may be employed because deletes can be easily made to data that is compressed using HCC by setting a bit in a delete vector, without touching the data to be deleted. On the other hand, if the main types of write data accesses to a portion of an IOT are additions and updates, then a lightweight compression (e.g., dictionary encoding) may be used or no compression at all.

In an embodiment, the compression determination component reevaluates data access history of an IOT periodically (e.g., weekly, daily, or hourly) and/or in response to certain events, such as certain latency thresholds or resource utilization thresholds being exceeded. For example, a latency threshold for reads is 100 milliseconds. If it takes over 100 milliseconds to read a compressed portion of an IOT, then the compressed portion may be immediately reevaluated and either (a) decompressed or (b) decompressed and then re-compressed using a more lightweight compression technique (if applicable). As another example, an average latency of decompressing may be calculated based on multiple data accesses to a compressed portion of an IOT and compared to a latency threshold to determine whether to trigger a reevaluation of changing the compression status of the compressed portion.

Similarly, a resource utilization threshold may be 100 megabytes of volatile memory. If over 100 megabytes of volatile memory is utilized in response to processing a request (e.g., a query or read request) relative to an uncompressed portion of an IOT, then the uncompressed portion may be immediately reevaluated and possibly compressed using one of multiple compression techniques, depending on the number of data accesses to the uncompressed portion.

Upon reevaluation of the data access history of an IOT, the compression determination component may cause the compression status of a portion of the IOT to change by, for example, instructing one or more compression/decompression components, where the instructions may identify the portion to decompress/compress and which decompression/compression techniques to use. For example, an overflow segment of an IOT is currently compressed using HCC. After reevaluation of the data access history of the overflow segment (and due to more frequent data accesses), the overflow segment is compressed using a lightweight compression technique. Thus, an HCC decompression component decompresses all overflow segments (or a strict subset of the overflow segments), followed by a lightweight compression component compressing the decompressed overflow segment(s). Similarly, an average resource utilization may be calculated based on multiple data accesses to an uncompressed portion of an IOT and compared to a resource utilization threshold to determine whether to trigger a reevaluation of changing the compression status of the uncompressed portion.

One or more rules may be defined that dictate whether and what type of compression (or compression technique) to use. Such rules may be hard coded into source code that processes data access history or may be defined in a configuration file that relevant processes can access at runtime to identify the one or more rules and apply them. An example rule may be "if W-O>3, then !HCC;" which means that if the number of writes to one or more overflow segments of an IOT is greater than three, then the one or more overflow segments are not to be compressed using HCC. Application of this rule may cause the one or more overflow segments to be decompressed if the overflow segments of the IOT are compressed using HCC. Another rule may define another type of compression technique to use for overflow segments based on other criteria.

A rule may take into account actual or estimated costs of compression and/or decompression. Costs may change over time based on workload of the computer/database system. For example, during a heavy workload period (i.e., with lots of data accesses), the cost of compression and decompression may be relatively high, while during a low workload period, the cost of compression and decompression may be relatively low. Thus, a rule may reference dynamic cost data that is updated independently (e.g., by a workload manager process) based on changes in workload. Application of the rule, then, would involve accessing the cost data to determine whether a change in compression status of an IOT (or portion thereof) is warranted.

When considering data access history information for determining whether to compress or decompress one or more portions of an IOT, only a portion of the data access history may be retrieved and analyzed. For example, only data access history log entries with a timestamp within the last week may be considered. Additionally, forecasts of data access history may be generated based on existing data access history information. Determinations of whether to compress or decompress may be made based on the forecasts. Thus, one or more portions of an IOT may be compressed or decompressed based on an anticipated change in data access pattern to the IOT.

Compression Techniques

In an embodiment, different portions of the same row in an IOT are compressed differently. For example, a key section of an IOT row in an index segment is not compressed, a non-key section of the IOT row in the index segment is compressed using a first type of compression (e.g., dictionary encoding), and a non-key section of the IOT row in an overflow segment is compressed using a second type of compression (e.g., HCC). In a similar example, instead of the key section in the index segment not being compressed, the key section is compressed using a third type of compression (e.g., prefix compression).

In an embodiment, an IOT is stored in one or more data blocks, each data block being of a certain size, such as 8 kilobytes (KB). Initially, the IOT may be compressed or uncompressed. For example, a key section of the IOT is compressed but the non-key section is uncompressed. As another example, the IOT resides uncompressed in memory without any data block boundaries being defined on the IOT. Based on data access history of the IOT, it is determined that the compression status of a portion of the IOT is to change. For example, an overflow segment of the IOT will be compressed using a compression technique. As another example, the non-key section of an index segment of the IOT will be compressed using a compression technique. As another example, if the key section of an IOT is compressed using one compression technique, it is determined that the non-key section will be compressed using a different compression technique.

A compression status of a portion of an IOT refers to whether the portion is compressed and, optionally, the compression technique that was used to compress that portion. Changing the compression status of a portion means that the portion is going from compressed to uncompressed, from uncompressed to compressed, or from compressed using one compression technique (e.g., RSAC) to compressed using another compression technique (e.g., HCC).

Being able to compress non-key sections of an IOT has multiple benefits. For example, an IOT that includes one or more overflow segments for storing one or more non-key columns may be able to exist without those overflow segments. This is possible if the one or more non-key columns in the overflow segment(s) are compressed. Even if those one or more non-key columns are not compressed, compressing one or more non-key columns in an index segment may result in being able to also store the one or more non-key columns (that would normally be stored in the overflow segment) in the index segment. Avoiding the use of overflow segments improves overall latency (even if the non-key column(s) need to be compressed in order to fit inside the index segment) in both reads and writes that would have otherwise required access to the overflow segments.

Header Changes

In an embodiment, compressing IOT data (whether in an index segment or an overflow segment) causes a header to be updated. The header is updated to indicate that the section is compressed by setting a flag. The header may be stored in a key section that is compressed, a key section that corresponds to a non-key section that is compressed, or an index segment if there is a reference (e.g., NRID 226) that points to/references an overflow segment that is compressed.

An example of updating a header in the prefix compression is a row header containing a flag bit that indicates whether the row is compressed using prefix compression. In one example, the row only contains suffix key rows and the prefix keys (which might be shared across many rows) are present in another section (prefix row slots) of a data block.

Block-Specific Compression

Many IOTs are large enough to individually require hundreds or thousands of data blocks to store the rows of an IOT. In an embodiment, compression of an IOT is performed on a block-by-block basis, resulting in potentially many data blocks of an IOT being compressed differently. For example, a first data block of an IOT may have no compression; a second data block of the IOT may be compressed using dictionary encoding; a third data block of the IOT may have the key section compressed using prefix compression, the non-key section of the index segments compressed using dictionary encoding, and the non-key section of the overflow segment compressed using HCC; and a fourth data block of the IOT may have the key section uncompressed and the entire non-key section compressed using HCC.

Such differences in compression from block-to-block may be based on different data access patterns and/or based on data distribution among an IOT. Thus, key columns in some sets of rows in an IOT may be best compressed using prefix compression (based on data distribution characteristics) whereas some overflow segments in other sets of rows in the IOT may be best compressed using HCC compression (based on data access history).

Reads

Database server 122 receives queries or read requests from client device 110. In response to a read request, one or more decompression techniques may be implemented for different portions of an IOT, which portions are targeted by the read request. A read request may specify one or more columns of the IOT, one or more predicates, and/or one or more aggregations. If an IOT has a single compression configuration (meaning that all non-key sections are compressed using a first compression technique and all key sections are uncompressed or compressed using a different compression technique), then the one or more columns specified in the read request are used to look up one or more compression techniques in a mapping of columns to compression techniques, which mapping is associated with the IOT. Thus, if a read request specifies two columns and the mapping maps the two columns to two different compression techniques, then processing the read request may involve using a first decompression technique to decompress data pertaining to one of the two columns and using a second decompression technique to decompress data pertaining to the other of the two columns. In embodiments where different blocks of an IOT may be compressed differently, then each IOT block includes a compression configuration that describes how the block is compressed. Thus, processing a read request may involve reading multiple compression configurations, each corresponding to a different block of an IOT.

If one of the two columns is not used in a projection, but is instead used in a predicate, then, depending on the compression technique that was used on that column, decompression of data in that column might not be required. For example, if the column is compressed using dictionary encoding, then data from the column is not decompressed. If the column is compressed using HCC or bit compression, then data from the column is decompressed.

DML Handling

A DML statement (or "DML" for short) requests an update to a database object (e.g., an IOT), such as adding rows, deleting rows, and modifying current values in rows. Without compression, executing DMLs against an IOT is straightforward. However, in the context of compressed IOTs, DMLs may need to be processed differently depending on the type of compression involved.

For additions or adding a new row to an IOT, once a data block is identified, it is determined whether the data block has space sufficient to add the new row. If not, then it is determined whether the data block may be recompressed using a different compression technique. If a different compression technique is not available or would not achieve data block size reduction, then the data block may be split into two data blocks and the rows in the data block would be redistributed into one of the two newly created data blocks with the new row in the proper place. Alternatively to block splitting, an adjacent data block may have sufficient space to shift one or more IOT rows from the identified data block to the adjacent data block. (Shifting one or more IOT rows from one data block to another would require an update to branch blocks of the IOT.) If there is not sufficient space in an adjacent data block, then a reorganization of the IOT as a whole may be required.

If an identified data block has sufficient space to add a new row, then one or more IOT rows may still need to be shifted to insert the new row in the appropriate location, unless the new row may be appended to the end of the rows in the identified data block while keeping the proper ordering. Regardless of whether shifting of existing IOT rows is required when inserting a new row, inserting the new row involves determining a compression status of each portion of IOT rows in the identified data block, presuming that all IOT rows in the identified data block are compressed in the same way. The compression status may be indicated in metadata of the identified data block. The compression status may identify the different portions of an IOT row, whether the identified portion is compressed, and/or the type of compression technique that was applied on the identified portion. (In scenarios where only a single compression technique is ever used, then the metadata might not indicate the compression technique.)

Some portions (such as one or more key columns in an index segment) may be uncompressed while other portions may be compressed. Also, some portions may be compressed using one compression technique while other portions may be compressed using another compression technique. For example, in a particular data block, the key section may be compressed with prefix compression, the non-key section in the index segment may be compressed with dictionary encoding, and the non-key section in an overflow segment may be compressed using HCC. In this example, when adding a new IOT row into the particular data block, then the key section of the new row is compressed with prefix compression, the non-key section in the index segment may be compressed with dictionary encoding, and any non-key section that cannot be stored in the index segment is compressed using HCC and stored in an overflow segment. Inserting new rows into other data blocks of the IOT may require a different set of compression techniques, depending on the compression status of those other data blocks. Initially, some or all portions of a data block remain uncompressed until a later point when no free space is left in the data block, after which one or more compression techniques are applied to the data block resulting in one or more of the compression configurations described herein.

For deletes, a data block is fetched containing a row that satisfies a query predicate defining what data is to be deleted. The fetched data block is decompressed in RAM (or cache), one or more rows are identified, and a flag for each identified is marked as deleted. This deletion may be a logical deletion, meaning the row is still physically present on disk. Some point later when the data block is reorganized, that space may be reclaimed.

While searching or looking up a leaf block containing relevant rows, one or more non-leaf blocks are analyzed, none of which is compressed.

For updates, once a data block is identified, in order to locate the appropriate IOT row to update, if the key section is compressed, then the key section of all the IOT rows in the identified data block may need to be decompressed. Such decompression is not necessary for some compression techniques, such as prefix compression and dictionary encoding. For example, a key value of an IOT row to be updated is encoded using a dictionary for the corresponding key column and the encoding is used to identify the appropriate IOT row. If the update is to a target value (i.e., that is another value other than the key value) in the identified IOT row, then a compression status of the column that corresponds to the target value is determined. The column may be a key column or a non-key column. The compression status and the type of compression technique used (if applicable) may be identified by examining the metadata of the identified data block. The new value (that is to replace the target value) is then compressed using the identified compression technique and then replaces the target value. Thus, an update can be in-place (which is less likely) or a delete followed by an insert, which is much more likely. For some compression techniques (such as HCC or bit compression), the IOT row is marked for deletion, any compressed contents of the IOT row are decompressed, and an updated (uncompressed) version of the IOT row is stored in another data block.

Example Process

Figure 3:
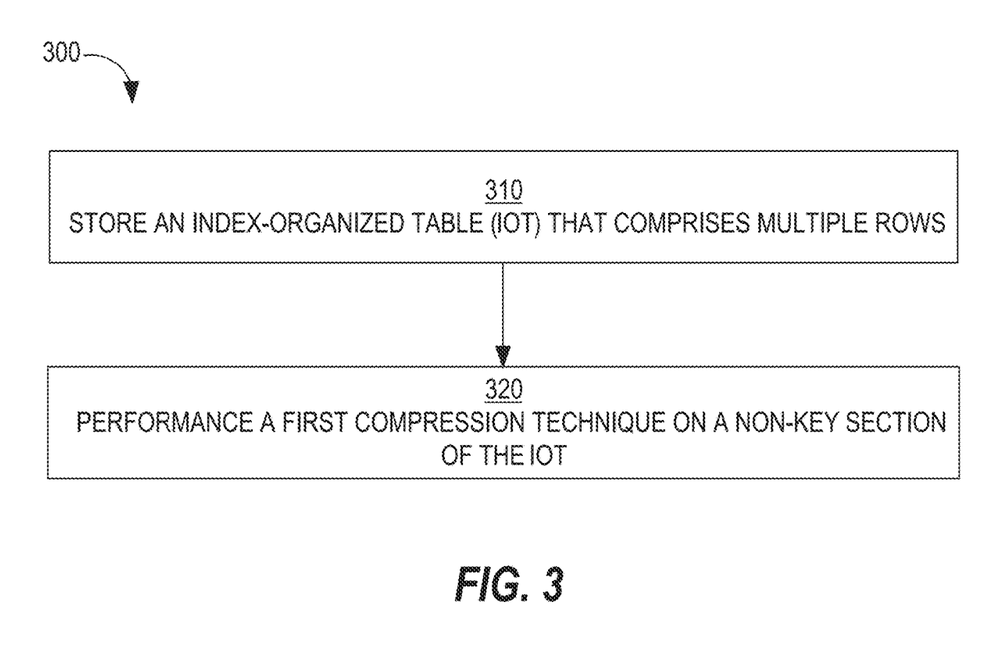
FIG. 3 is a flow diagram that depicts an example process for compressing an IOT, in an embodiment.

FIG. 3 is a flow diagram that depicts an example process 300 for compressing an IOT, in an embodiment. Process 300 may be performed by compute node 120 and/or storage node 130.

At step 310, an index-organized table (IOT) that comprises multiple rows is stored. Each row comprises an uncompressed key section and an uncompressed non-key section. The key section is stored in an index segment of the row, while the non-key section may be stored entirely in the index segment, entirely in an overflow segment, or one portion of the non-key section may be stored in the index segment and another portion of the non-key section may be stored in the overflow segment.

At step 320, a first compression technique is performed on the non-key section of each row to generate multiple compressed non-key sections. Step 320 may be performed by a compression component. As a result of the compression, none of the key sections of the multiple rows is compressed using the first compression technique. Instead, the key sections of the multiple rows may (a) be compressed using a second compression technique that is different than the first compression technique or (b) remain uncompressed.

Step 320 may be preceded by an access tracking component that generates data access history and a compression determination component that analyzes the data access history of the non-key section (and, optionally, of the key section). For example, the data access history may indicate that few, if any, data accesses may have occurred to the non-key section, meaning that a heavyweight compression, such as a bit compression technique, is warranted. Alternatively, the data access history may indicate that few, if any writes may have occurred to the non-key section, but at least a threshold number of number of reads have occurred to the non-key section, suggesting that another heavyweight compression that lends itself to reads is warranted, such as HCC.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
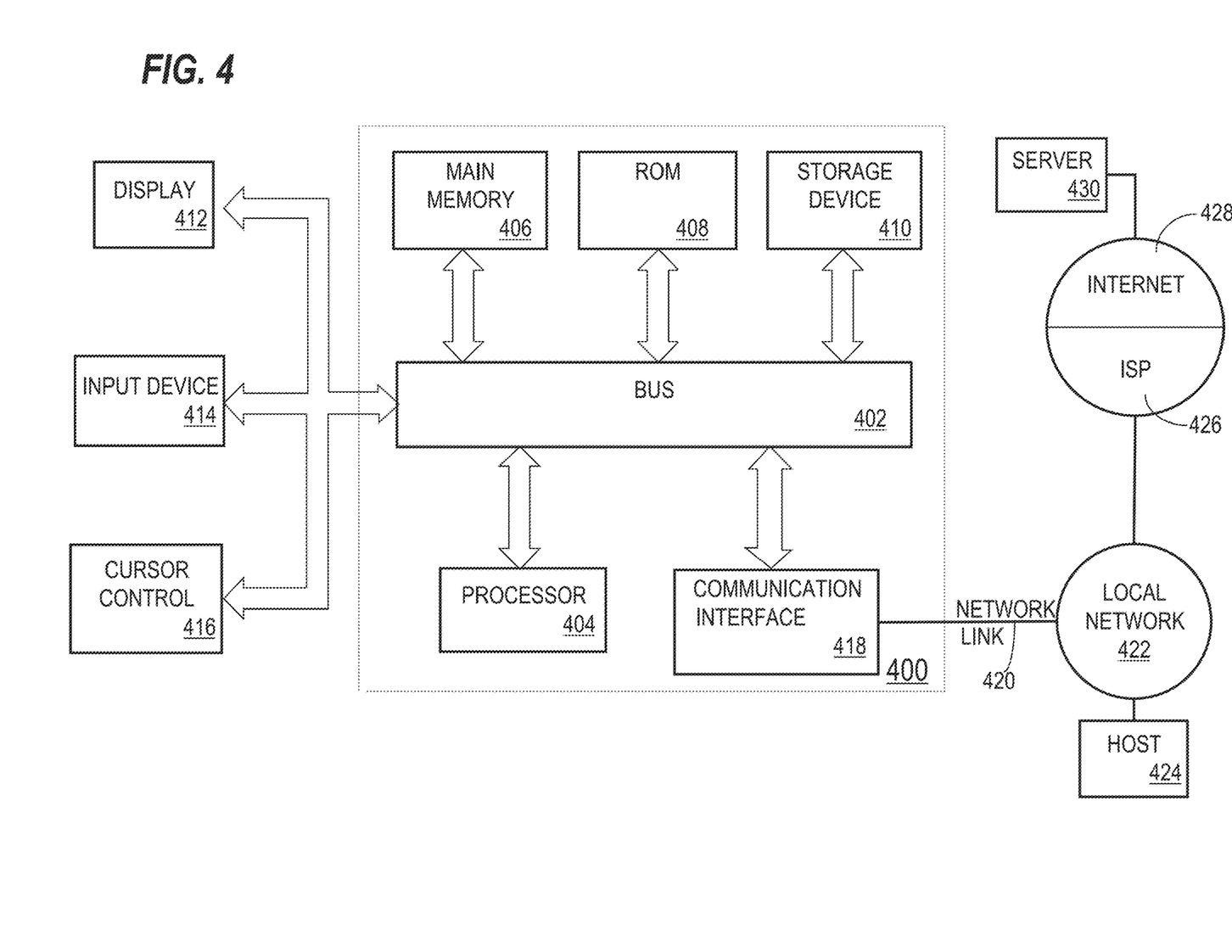
FIG. 4 is a block diagram that illustrates an example computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
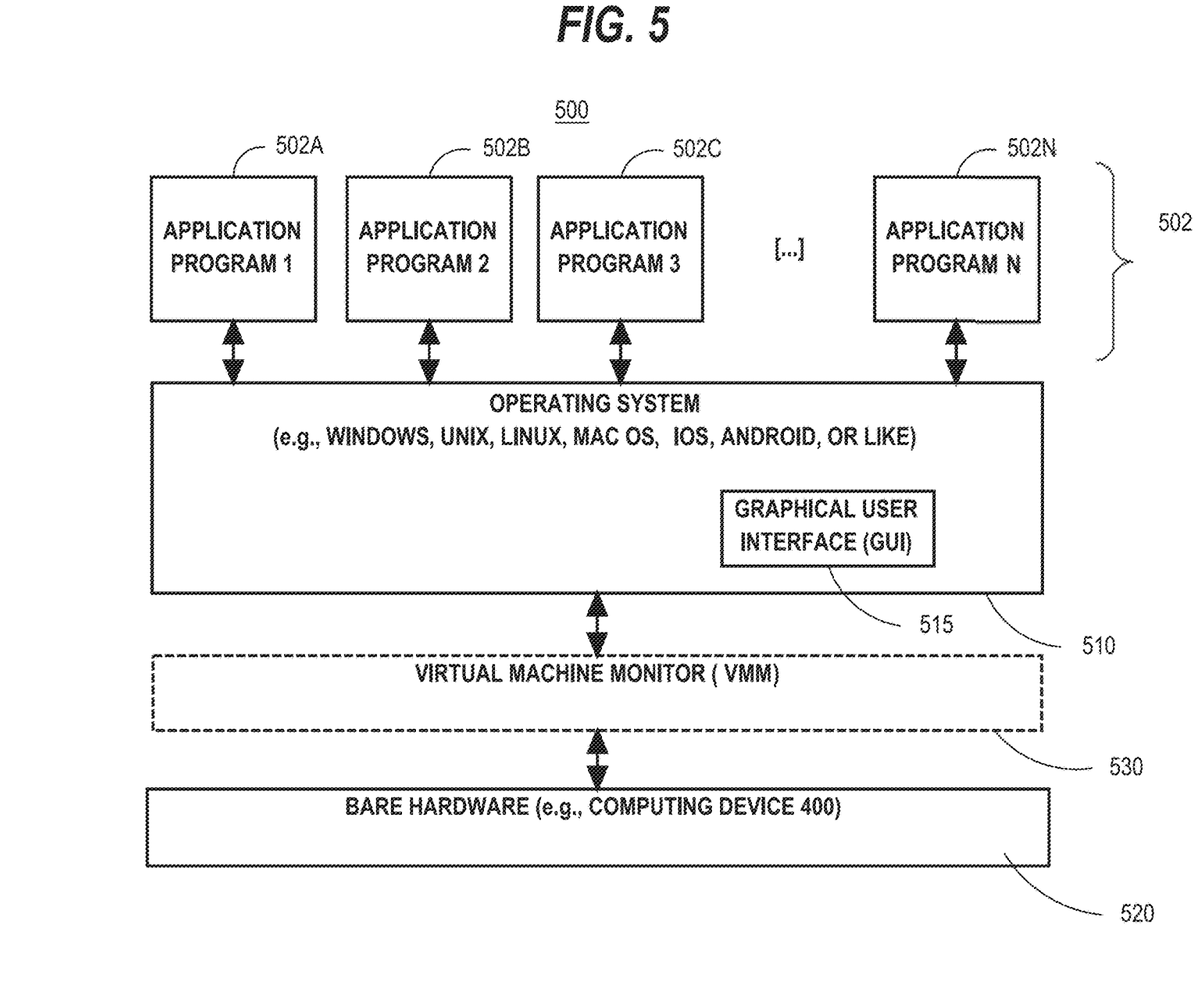
FIG. 5 is a block diagram of a basic software system that may be employed for controlling the operation of the example computer system, in an embodiment.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing an index-organized table (IOT) that comprises a plurality of rows, each of which comprises a key section and a non-key section;
   after storing the IOT, performing a first compression technique on the non-key section of each row in the plurality of rows to generate a plurality of compressed non-key sections;
   wherein none of the key sections of the plurality of rows is compressed using the first compression technique;
   performing a second compression technique, that is different than the first compression technique, on the key section of each row in the plurality of rows to generate a plurality of compressed key sections;
   wherein the plurality of compressed key sections are stored concurrently with the plurality of compressed non-key sections;
   wherein the method is performed by one or more computing devices.

2. The method of claim 1, wherein the key section of each row of the plurality of rows and the non-key section of each row of the plurality of rows are stored in index segments of the IOT.

3. The method of claim 1, wherein the key section of each row of the plurality of rows is stored in index segments of the IOT and a portion of the non-key section of each row of the plurality of rows is stored in one or more overflow segments of the IOT.

4. The method of claim 1, wherein the plurality of rows is a first plurality of rows that is different than a second plurality of rows in the IOT, wherein the plurality of compressed non-key sections is a first plurality of compressed non-key sections, the method further comprising:
   performing a third compression technique, that is different than the first compression technique, on the non-key section of each row in the second plurality of rows to generate a second plurality of compressed non-key sections that is different than the first plurality of compressed non-key sections.

5. The method of claim 1, further comprising, prior to performing the first compression technique:
   identifying data access history that is associated with the IOT, wherein the data access history indicates a plurality of data accesses to non-key sections of the plurality of rows;
   automatically performing an analysis of the plurality of data accesses;
   based on the analysis, selecting the first compression technique from among a plurality of compression techniques.

6. The method of claim 5, wherein:
the plurality of data accesses is a first plurality of data accesses;
the plurality of rows is a first plurality of rows;
the data access history indicates a second plurality of data accesses to a second plurality of rows;
automatically performing the analysis comprises automatically performing a second analysis of the second plurality of data accesses;
the method further comprising, based on the second analysis, determining to not compress one or more sections of the second plurality of rows.

7. The method of claim 1, further comprising:
in response to receiving a read request that specifies a first column and a second column of the IOT:
identifying a third compression technique that is associated with the first column and a fourth compression technique that is associated with the second column and that is different than the third compression technique;
decompressing first data from the first column based on a first decompression technique that corresponds to the third compression technique;
decompressing second data from the second column based on a second decompression technique that corresponds to the fourth compression technique.

8. The method of claim 1, further comprising:
in response to receiving a write request that specifies (1) first data for a first column of the IOT and (2) second data for a second column of the IOT:
identifying a third compression technique that is associated with the first column and a fourth compression technique that is associated with the second column and that is different than the third compression technique;
compressing the first data using the third compression technique;
compressing the second data using the fourth compression technique.

9. One or more storage media storing instructions which, when executed by one or more computing devices, cause:
storing an index-organized table (IOT) that comprises a plurality of rows, each of which comprises a key section and a non-key section;
after storing the IOT, performing a first compression technique on the non-key section of each row in the plurality of rows to generate a plurality of compressed non-key sections;
wherein none of the key sections of the plurality of rows is compressed using the first compression technique;
performing a second compression technique, that is different than the first compression technique, on the key section of each row in the plurality of rows to generate a plurality of compressed key sections;
wherein the plurality of compressed key sections are stored concurrently with the plurality of compressed non-key sections.

10. The one or more storage media of claim 9, wherein the key section of each row of the plurality of rows and the non-key section of each row of the plurality of rows are stored in index segments of the IOT.

11. The one or more storage media of claim 9, wherein the key section of each row of the plurality of rows is stored in index segments of the IOT and a portion of the non-key section of each row of the plurality of rows is stored in one or more overflow segments of the IOT.

12. The one or more storage media of claim 9, wherein the plurality of rows is a first plurality of rows that is different than a second plurality of rows in the IOT, wherein the plurality of compressed non-key sections is a first plurality of compressed non-key sections, wherein the instructions, when executed by the one or more computing devices, further cause:
performing a third compression technique, that is different than the first compression technique, on the non-key section of each row in the second plurality of rows to generate a second plurality of compressed non-key sections that is different than the first plurality of compressed non-key sections.

13. The one or more storage media of claim 9, wherein the instructions, when executed by the one or more computing devices, further cause, prior to performing the first compression technique:
identifying data access history that is associated with the IOT, wherein the data access history indicates a plurality of data accesses to non-key sections of the plurality of rows;
automatically performing an analysis of the plurality of data accesses;
based on the analysis, selecting the first compression technique from among a plurality of compression techniques.

14. The one or more storage media of claim 13, wherein:
the plurality of data accesses is a first plurality of data accesses;
the plurality of rows is a first plurality of rows;
the data access history indicates a second plurality of data accesses to a second plurality of rows;
automatically performing the analysis comprises automatically performing a second analysis of the second plurality of data accesses;
the instructions, when executed by the one or more computing devices, further cause, based on the second analysis, determining to not compress one or more sections of the second plurality of rows.

15. The one or more storage media of claim 9, wherein the instructions, when executed by the one or more computing devices, further cause:
in response to receiving a read request that specifies a first column and a second column of the IOT:
identifying a third compression technique that is associated with the first column and a fourth compression technique that is associated with the second column and that is different than the third compression technique;
decompressing first data from the first column based on a first decompression technique that corresponds to the third compression technique;
decompressing second data from the second column based on a second decompression technique that corresponds to the fourth compression technique.

16. The one or more storage media of claim 9, wherein the instructions, when executed by the one or more computing devices, further cause:
in response to receiving a write request that specifies (1) first data for a first column of the IOT and (2) second data for a second column of the IOT:
identifying a third compression technique that is associated with the first column and a fourth compression technique that is associated with the second column and that is different than the third compression technique;

compressing the first data using the third compression technique;

compressing the second data using the fourth compression technique.

17. A system comprising:

one or more computing devices;

one or more storage media storing instructions which, when executed by the one or more computing devices, cause:

storing an index-organized table (IOT) that comprises a plurality of rows, each of which comprises a key section and a non-key section;

after storing the IOT, performing a first compression technique on the non-key section of each row in the plurality of rows to generate a plurality of compressed non-key sections;

wherein none of key sections of the plurality of rows is compressed using the first compression technique;

performing a second compression technique, that is different than the first compression technique, on the key section of each row in the plurality of rows to generate a plurality of compressed key sections;

wherein the plurality of compressed key sections are stored concurrently with the plurality of compressed non-key sections.

18. The system of claim 17, wherein the key section of each row of the plurality of rows and the non-key section of each row of the plurality of rows are stored in index segments of the IOT.

19. The system of claim 17, wherein the key section of each row of the plurality of rows is stored in index segments of the IOT and a portion of the non-key section of each row of the plurality of rows is stored in one or more overflow segments of the IOT.

20. The system of claim 17, wherein the plurality of rows is a first plurality of rows that is different than a second plurality of rows in the IOT, wherein the plurality of compressed non-key sections is a first plurality of compressed non-key sections, wherein the instructions, when executed by the one or more computing devices, further cause:

performing a third compression technique, that is different than the first compression technique, on the non-key section of each row in the second plurality of rows to generate a second plurality of compressed non-key sections that is different than the first plurality of compressed non-key sections.

\* \* \* \* \*